May 13, 1969 R. E. LUKIANOV 3,444,535

FOLDED WEB ROD MEMORY ARRAY

Filed June 8, 1965 Sheet 1 of 2

INVENTOR
ROMAN E. LUKIANOV

BY Richard J. Donahue
AGENT

INVENTOR
ROMAN E. LUKIANOV

BY Richard J. Donahue
AGENT 3,444,535
Patented May 13, 1969

3,444,535

FOLDED WEB ROD MEMORY ARRAY

Roman E. Lukianov, Framingham, Mass., assignor to Honeywell Inc., Minneapolis, Minn., a corporation of Delaware Filed June 8, 1965, Ser. No. 462,326
Int. Cl. G11b *5/80, 5/74;* G11c *5/02*
U.S. Cl. 340—174 10 Claims

ABSTRACT OF THE DISCLOSURE

A rod memory array having multiturn solenoidal coil matrix cards of printed circuit construction. Each card consists of an insulative web having conductors disposed thereon which sinuously extend about the rows of rod holes in the web. The web is folded so as to present complementary semi-coil segments in registry and form multiturn solenoidal coils about the individual rods in the matrix.

Figure 1A:
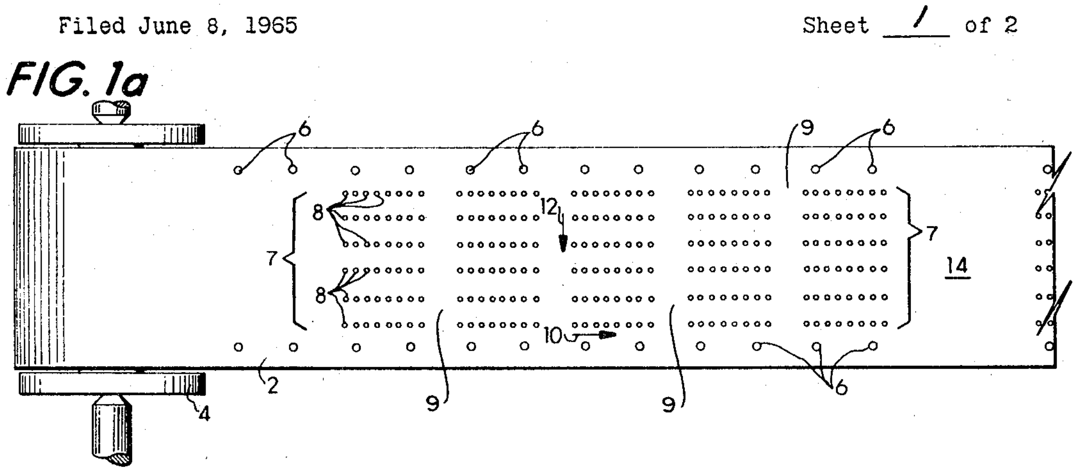

The present invention relates, in general, to digital data storage apparatus, and more particularly, to an improved coil matrix structure for a magnetic rod type thin film memory array.

The problem of digital information storage in the data processing arts has presented many challenges to magnetic memory array manufacturers. For instance, there are many applications, such as in the rod type memory array, where a plurality of aligned coil structures are required in a form that is at once easy and inexpensive to fabricate, that is easy to assemble, that provides variable, yet constantly controlled spacing between coil members, that allows one to vary the coil configuration at will, that allows the packing of coil turns in a minimum volume and so forth. The present invention is related to providing such an improved coil array, and more particularly, provides a coil matrix configuration simply by laying down any prescribed pattern of conductors on a flexible web and thereafter folding the web to superpose different segments of each coil in prescribed registry.

This problem of fashioning such an array of coils is especially a long-felt need relative to providing magnetic random access memory arrangements in computers. While computers have used as a form of magnetic memory, a three-dimensional matrix of magnetic cores, a very common expedient, and arrays of flat thin films, these arrangements have several disadvantages such as the difficulty in expensive fabrication and the space (volume) required per unit of data storage and the difficulty of repair. Thus, the workers in the art have turned to a third form of magnetic memory, namely a magnetic rod memory, which, in certain instances, has the advantages of higher bit storage density, more attractive fabrication possibilities, and lower repair costs and the like. Such a magnetic rod memory array is disclosed, for instance, in an article by Donal A. Meier, entitled, "A Five Megacycle DRO Thin Film Rod Memory" (1963 Proceedings of the ITERMAG Conference—Manual T–149, pages 9–4–1 to 9–4–11). Workers in the art recognize the advantages of such a rod memory array, but they also recognize that it is quite problematical to provide the matrix of coils necessary to interrogate selectable data storage segments of the magnetizable rods. For instance, the above publication by Meier discloses a coil arrangement which is extremely complex to fashion, in that it requires expensive automatic winding machinery to wind the multi-turn solenoidal windings in a carefully aligned matrix array and moreover requires careful positioning and mounting expedience to mount these matrix arrays in vertical registry so as to engage a single cylindrical rod at different memory levels, which lie along a common "memory plane," common to all of the rods in the rod matrix.

Thus, workers in the art have turned to simplified printed circuit coil arrangements such as arrangements which pass a coil length about a plurality of linearly aligned rods as a group, rather than about each rod individually. The latter arrangement is relatively simple to fabricate and easy to install about successive linear arrays of rods, but suffers from serious defects in magnetic efficiency, since no more than one turn can be wrapped conveniently about each rod and even this turn segment does not completely surround an individual rod within the group and thus provides a field which is imperfectly coupled to the rod. The present invention provides a coil matrix which suffers from none of the above drawbacks.

Thus, it is an object of the present invention to provide a coil matrix arrangement which meets the above problems and disadvantages. It is another object of the invention to provide such a matrix which is especially adapted to provide a simplified and more efficient coil matrix for rod memory arrays.

A more particular object is to provide such a matrix which is easy to fabricate without requiring individual coil windings, being faster to fabricate, and less expensive than that of the prior art.

Still another object is to provide such a matrix which allows one to choose the configuration and spacing of the coil turns at will and thereafter maintain them constant, conveniently, thus automatically locating coils in a matrix.

Still another object is to provide such a matrix in which the compactness and coil efficiency are greatly improved.

Still another object of the invention is to provide such a coil array associated with a magnetic rod memory array which is convenient for rod insertion and positioning, and removability without upsetting the coil matrix. Another object is to provide such an arrangement wherein the adjacent coil positions are automatically located and conveniently may be changed in spacing or configuration at will. Still another object is to provide such an arrangement wherein a coil configuration which follows the periphery of the memory rods (variable) may be provided in a manner which is simple and easy to fabricate.

Still another object of the invention is to provide a rod memory array wherein multi-turn solenoidal windings of printed circuit construction are used. Still another object is to provide such a memory wherein individual storage units within each rod are provided with a concentrated flux pattern. Yet another object is to provide such a memory array which can be rapidly and economically fabricated and tested with automatically controlled machinery. A further object is to provide such a memory array wherein magnetic shields may be easily interposed between adjacent solenoidal coil matrices along the length of magnetic rod memory elements.

One preferred form of the present invention provides the above features and advantages by providing printed solenoidal coil segments in a continuous sinuous pattern on a flexible non-conductive web, having a plurality of such coil matrices laid thereon. These matrices comprise a parallel set of conductor (coil) segments deposited on a segment of the web to assume substantially identical waveforms which comprise a symmetrically sinuous constant conductor segment which symmetrically and alternately half surrounds center-points spaced equidistant along a matrix axis. These coil matrices are repeated at regular intervals along the web so that successive pairs of matrices may be superposed by folding the web so that the aforementioned center-points are in registry. Such an array is suitable for accepting linear sets of memory rods and these sets are preferably attached to terminal boards for each insertion thereof through the planar coil array or coil card. Further, multiple units of such cards may be disposed in different planes along the length of the matrix of rods and according to a preferred embodiment, may employ shielding materials therebetween where necessary. Unlike the individually wound or the looped form of coil arrangement for magnetic rod matrices, the invention provides a coil arrangement which is simple to fabricate and to repair, which provides simplified insertion and removal thereof with respect to the rod portion, which provides a more compact coil arrangement capable of higher bit density, and nonetheless, high inductive efficiency despite its simplified fabrication.

Figure 1B:
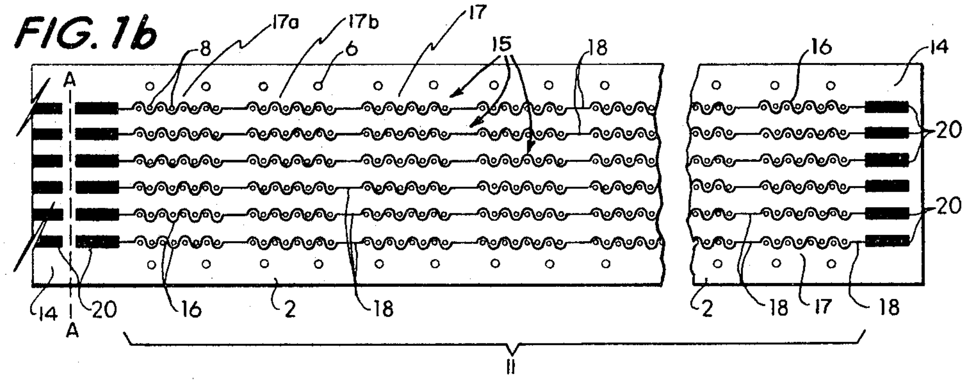
Figure 1C:
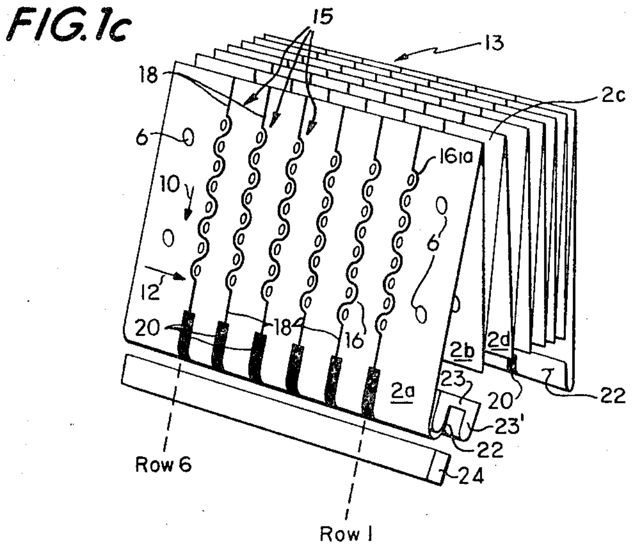
Figure 2:
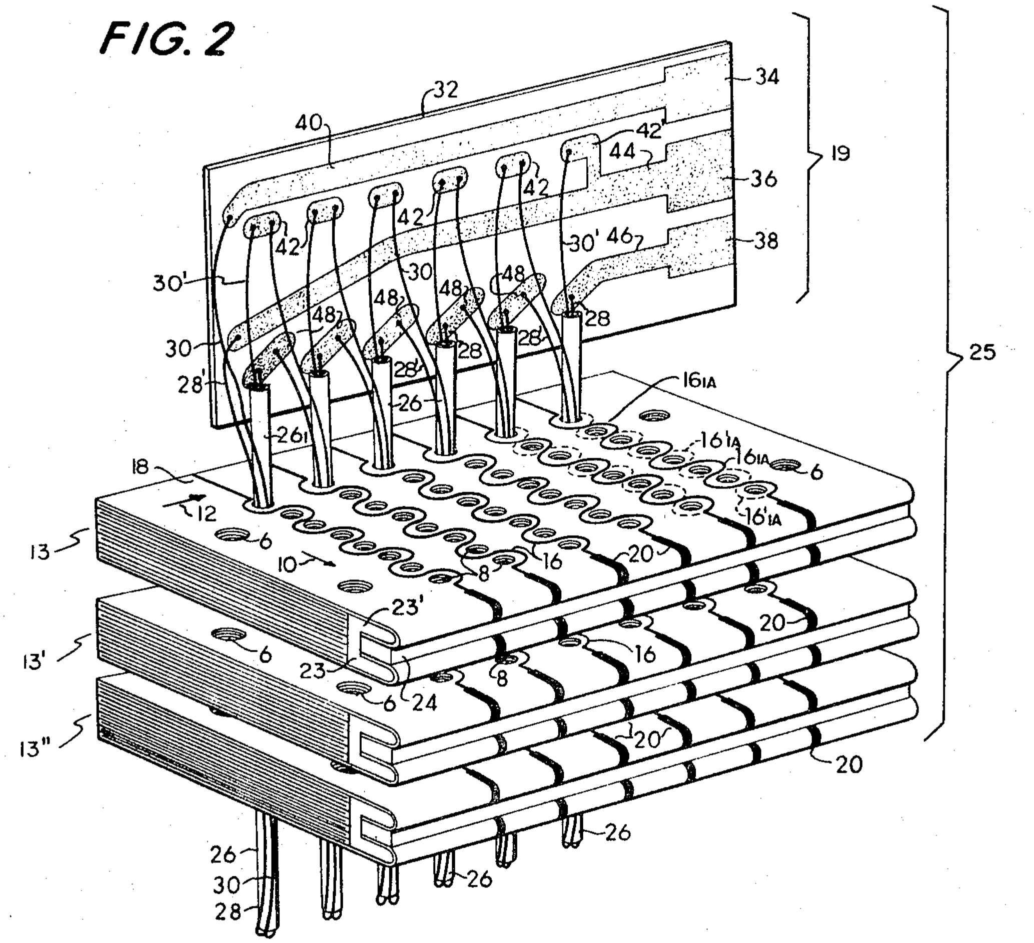

The above features and advantages, as well as others, will become evident to those skilled in the art upon consideration of the following description of a preferred embodiment of the invention, especially in conjunction with the following drawings:

FIGURE 1*a* illustrates a segment of a copper-clad plastic web upon which a prescribed pattern of "rod-holes" has been formed;

FIGURE 1*b* illustrates the segment shown in FIGURE 1*a* whereon a portion of the copper-clad elastomeric web has been etched away to exhibit parallel rows of printed circuit conductors comprising coil-segments, according to the invention;

FIGURE 1*c* shows the printed circuit sheet of FIGURE 1*b* in the process of being folded, to form a solenoidal matrix card, according to the invention; and FIGURE 2 shows an enlarged and expanded view of a partially completed magnetic rod memory array including a plurality of the cards according to the invention indicated in FIGURE 1*c*, and in addition, a mounting arrangement for the linear array of magnetic rods.

Referring now more specifically to FIGURE 1*a* of the drawings, there is shown a copper-clad elastomeric web, namely a suitable flexible plastic ribbon 2 upon which has been deposited, or laminated, a thin layer of copper suitable for forming printed circuit conductor portions. The copper-clad plastic web 2 may be wound upon a spool 4, as shown. As indicated, web 2 is in the process of being provided with a pattern of perforations 6, 8, etc. according to a prescribed (though variable) pattern. More particularly, web 2 is perforated along both edges to exhibit a pair of rows of regularly-spaced mounting holes 6. Intermediate the mounting hole rows, web 2 is also perforated to provide successive rod-hole matrices 7, each matrix being comprised of a prescribed identical pattern of individual rod holes 8 arranged in parallel rows (along arrow 10) and columns (along arrow 12). While the rod-holes 8 may extend continuously and regularly along web 2, in certain cases it will be advantageous to interrupt these matrix patterns 7, as shown, to provide a spacing between matrices, as indicated at the blank, unperforated segments 9 along web 2. Similarly, it is preferred to interrupt this pattern of successive rod-hole matrices 7, periodically, as indicated at blank portions 14 along web 2 to terminate the set of matrices 7 at a number corresponding to a prescribed number of coil turns, as explained below. The mounting holes 6 may be similarly omitted along blank portions 14 as shown. As will be seen below, interrupted portions 9 will accommodate the inter-matrix segments of the continuously applied conductors while blank portions 14 accommodate the terminal sections of those conductors.

FIGURE 1*b* shows a section of the copper-clad web 2 of FIGURE 1*a* after the latter has been etched, by known processes, to remove the copper material according to a prescribed pattern which leaves a number of continuous conductor portions 15 comprising arcuate portions 16, rectilinear portions 18 and terminal connector segments 20 at the ends thereof, each portion 15 extending continuously along one row between all of the matrices. Each of the conductors 15 will thus be seen to lie along a different one of the rows of the rod-holes 8 and to undulate sinuously around the holes 8 in alternating semi-circular arcuate segments, i.e. portions 16. For reasons which will become more apparent below upon consideration of the configuration of the memory rods 26 (FIG. 2), these arcuate conductor segments formed by each conductor 16 preferably conform to a great degree to the peripheral shape of the memory rods 26 to be inserted in holes 8. Thus, arcuate portions 16 curve conformingly about circular holes 8 in semi-circular arcs partially surrounding holes 8 and the cylindrical rods 26 to be inserted therein (FIG. 2). Thus the series of arcuate portions 16 extend along multiple parallel rows in each hole matrix 7 to form, therewith, hole-coil or semi-solenoid matrices 17. That is, the sinuous segments of conductors 15 along a semi-solenoid matrix such as **17*a* comprise continuous semi-coil segments cooperating with corresponding segments in the following semi-solenoid matrix (17*b*) to form rows of completed solenoid windings about holes 8**.

It will be apparent that the arcuate portions 16 of conductors 15 will be adapted to conform to the periphery of the memory rod devices to be inserted in the holes 8 around which they are led. Thus, a change in shape of rods 26 would dictate preferably a corresponding change in the shape of segments 16 to correspond to the periphery thereof. An important feature of the configuration of conductors 15, and especially the arcuate sinuous portion 16 thereof is that they are carefully arranged to partially surround holes 8 in a symmetrical manner. It will be apparent from a consideration of FIGURE 1*c* that such encircling symmetry permits printed web 2 to be folded so as to superpose adjacent semi-solenoid matrices 17 in alternating fashion; that having this symmetry the half-coil portions formed by each matrix 17, for instance, matrix **17*a* on web section 2*a* and matrix 17*b* on adjacent web section 2*b*, which is folded against 2*a*, will provide complementary coil-completing conductor portions about each of the holes 8**, as long as one sinuous configuration is symmetrically opposite the next configuration.

As above mentioned the sinuous portion of conductors 15, winding through each row of holes 8 in a matrix 7 is continuously to be ohmically integral with the adjacent matrix-row by rectilinear portions 18 preferably. As will be evident from inspection of FIGURE 1*c*, rectilinear connecting segments 18 of conductors 15 thus provide intervals between matrices 7, at which the web 2 may be folded and wherein neither the holes 8 nor the surrounding arcuate conductor segments 16 are required. It will be recognized by those skilled in the art that rectilinear segments 18 may, where it is preferred, be dispensed with and as indicated with respect to FIGURE 1*a*, holes 8 punched continuously along web 2 with no interval 9 therebetween, thus necessitating the folding of web 2 across the perforated portions thereof. One advantage to this alternate embodiment to that shown is that it allows greater modularity in the arrangement in folding of web 2 so that the number of consecutive holes 8 in a matrix 7 may be varied using the same basic printed circuit web 2. However, one slight disadvantage is that providing perforations adjacent the folded segments of web 2 may weaken the web somewhat mechanically. Thus, each of the wave-like printed circuit conductor portions 16 of each conductor 15 in a block or matrix 7 is connected to its counterpart 16 in the adjoining matrix 7 by means of rectilinear joining conductor portions 18.

Preferably, a prescribed number of blocks or hole-matrices 7 are termined to form a matrix group or Group 11, such as the group partially indicated (web broken for simplicity) in FIGURE 1b wherein Group 11 here comprises 14 matrices 7, which when folded as indicated in FIGURE 1c, comprise 7 complete folds, forming 7 complete coils turns about each of the holes 8. When the matrices 7 are thus interrupted, it has been found preferable to form the terminal rectilinear portions 18 so as to comprise enlarged contact portions 20 which having a greater surface area, provide a better ohmic contact with connector means, as better understod in connection with FIGURE 2.

It will be evident to those skilled in the art, however, that as in the case of the rectilinear segments 18, in certain cases it may be desired to eliminate contact portions 20 and further to continue the matrices 7, uninterruptedly along the length of web 2 without indicating and definite matrix-grouping as for Group 11. It will be evident that although this will present certain difficulties in making contact with energizing terminals for matrix blocks, that in some cases, such an arrangement may be preferable in that being modular as to matrix groups, it will allow workers to use a single standard printed circuit web 2 for forming different sized matrix Groups 11 to surround memory rods 26, for instance, with different numbers of coil-turns.

As indicated in FIGURE 1c, the printed circuit web segment 2 indicated in FIGURE 1b may be cut along line A—A and folded into a plurality of similar web segments *2a*, *2b*, etc., so that prescribed ones of the mounting holes 6 and the rod-holes 8 in each matrix 7 will be placed in registry with those with analogous holes of the other matrices 7. Thus, FIGURE 1*c* shows the printed circuit web 2 of FIGURE 1*b* after it has been folded at the mid-point of each of the rectilinear conductor segments 18 to form a solenoidal coil card 13. It will be noted, that each pair of adjacent hole-matrices 7, when folded, thus form an "inductively-continuous" circumferential winding symmetrically about each of the rod-holes 8. Thus, it will be apparent that this symmetrical sinuosity of segment 16 above holes 8 requires that the segment 16 be symmetrically spaced relative to the center of holes 8 so that when energized, with a current flowing therethrough, they form an electro-magnetic field pattern which is relatively concentric with holes 8, and thus best adapted to interact magnetically with the record portion of memory rods 26, as indicated in FIGURE 2. This is more properly shown in FIGURE 2 by the sinuous conductor segment $\mathbf{16_{1A}}$ on row 1 of web segment *2a* together with $\mathbf{16'_{1A}}$ which is the complementary coil portion to segment $\mathbf{16_{1A}}$, being laid along adjacent web segment $2_b$ and when folded, infraposed complementarily the segment $\mathbf{16_{1A}}$ to form inductively-complete coil-turns about each of the holes 8 along this row. It will be evident that the other underlying folds, e.g. *2c*, *2d*, etc., bring the following matrices 7 into superposed registry so as to add effectively one coil-turn for each of the folds, or a total of 7 complete windings for each row in card 13. As will be recognized, a feature of this arrangement is that besides allowing a convenient mechanical folding to create three dimensional coils from a coplanar web printing, this alternate folding pattern is peculiarly adapted electrically to providing complementary coil sections.

The segments of printed ribbon 2 constituting coil-card 13 are also folded adjacent the ends thereof, namely midway along the printed circuit terminal contacts 20, the end portions 22 of web 2 being folded back re-entrantly as indicated. Ends 22 are inserted into each end of a U-shaped connector 23 (along the internal sides) and a locking bar 24 is thereafter wedged therebetween, fitting snugly between the end-portions 23' of connector 23. Thus, internal connector 23 comprises a U-shaped member adapted to receive the terminal portions of card-lengths of printed web 2, the beveled flange portions or sides 23' thereof being spaced apart to receive a locking bar 24 of substantially parallelepiped shape snugly therein. Thus, the segment of printed ribbon 2 including matrix group 11 and terminal connectors 20 inclusive thereof, when folded, and impressed within connector elements 23–24 forms a multi-turn solenoid coil card 13, having particular utility in connection with memory rod arrays as indicated with respect to FIGURE 2 below.

In the course of folding the segment of web 2 illustrated in FIGURE 1*c*, it may be desirable to insulate adjacent conductor portions lying along superposed web segments *2b*, *2c* and the like, so as to prevent short circuiting therebetween. It is a feature of the invention that this may be easily accomplished according to the above-described embodiment, for instance, by coating or spraying the printed face of web 2 with a non-conductive material to insulate adjacent printed circuit conductors from one another when folded.

As an added advantage, it will be recognized that the insulating coating may be made adhesive as well to bind the folds to one another as well as to provide electrical insulation therebetween. Of course, other insulating means may be convenient to use with the invention alternatively, such as providing thin plastic insulator sheets to be inserted intermediate the contacting folds such as web segments *2b*, *2c*.

Thus, it will be recognized that by those skilled in the art, the invention, as described above, provides a unique structure and method for fabricating coil matrices by depositing upon a flexible, non-conductive web, a plurality of parallel sinuous conductors which assume substantially identical waveforms which are symmetrical about the reference axis in a pattern which is symmetrically and alternately repeated whereby this web may be folded transverse to its length so as to superpose alternate conductor matrices which comprise pairs of sinuous conductor segments which are inductively complementary and alternatively half-surround center-points spaced equidistantly along a matrix axis.

FIGURE 2 illustrates a rod memory configuration, especially adapted for using the coil cards 13 described above and particularly indicated in FIGURE 1*c*. More particularly, FIGURE 2 illustrates a three-dimensional rod memory array 25 comprising coil-cards 13, 13' and 13'' arranged to receive a plurality of memory rod-connector plate arrays 19, only one of which is indicated here for purposes of clarity. For purposes of clarity, only three such coil cards 13, 13', 13'' have been shown and these cards have been separated by exaggerated spacing in the array, though it may be understood that they may be contiguous, and may also have a magnetic shielding member located therebetween where preferred. Rod-connector array 19 will be seen as comprising a linear set of memory rods 26 in combination with a printed circuit board. Cylindrical memory rods 26 will be recognized by those skilled in the art as being somewhat commonly used and comprising a cylindrical non-magnetic substrate rod, having deposited thereon a magnetic surface coating or film, upon which a magnetic impression may be left, for instance by the coils formed by coil-cards 13, etc. While only one such column of rods 26 has been shown together with its associated printed circuit baseboard 32, it will be understood that in a completed memory array, other such column-rod-connector arrays 19 will be inserted in the remaining holes to cards 13, 13', etc.

Each of the magnetic rods 26 is threaded by a sense wire 28 and a digit drive wire 30, the ends of which are serially connected at baseboard 32 comprising a non-conductive substrate upon which are printed various connector contacts in a manner well known in the art. Thus, printed baseboard 32 has a digit wire contact 34, a common digit-sense wire contact 36 and a sense wire contact 38, each of which is connected to associated digit and sense wires threaded with memory rods 26 through coil-cards 13, 13′, etc. The digit wire contact 34 is attenuated to form a conductor 40 which extends across the length of board 32. The digit wire 30 associated with the first in line of the memory rods 26, that is $26_1$ is soldered to the conductor 40. The other end of digit wire 30, after passing through the hole 8 of each solenoidal coil card 13, 13′, etc. and then through the magnetic rod 26 through which it is returned re-entrantly, for instance, at portion 30′ thereof is serially connected to the digit wire 30 of the adjacent magnetic rod 26 by means of a contact link 42 printed on board 32. Thus, each of the digit wires 30 is threaded through coil-cards 13, 13′, etc. with an associated memory rod 26 and being returned through the hollow center thereof at portion 30′ is connected to the next digit wire 30 in line serially by contact link 42. This serial connection of digit wires continues down the column of memory rods 26 terminating at contact link 42′ which is ohmically connected to printed contact 36 along an attenuated portion 44 thereof. In a similar manner, the sense contact 38 printed on board 32 is attenuated to include a narrowed conductor portion 46. The sense wires 28 are threaded through holes 8 in coil-cards 13, etc. alongside the associated memory rod 26 and returned re-entrantly back through the hollow interior thereof in the same manner as the digit wires 30. Sense wires 28 are also serially connected at contact links 48 printed on board 32 in the above-indicated manner for digit wires 30; the last sense wire in line met is the wire through rod $26_1$ being returned along the external portion thereof 28′ to the common digit-sense contact 36 via conductor portion 44. (The sense wires 28 are introduced through the hollow interior of rods 26 and returned along the exterior thereof, external portions 28′ being threaded through the rod-holes 8 in cards 13, etc. along with their associated memory rod 26.)

In operation, it will be recognized that the fabrication of coil-cards 13, 13′, etc. according to the invention will provide a matrix of coils, each coil symmetrically surrounding one rod-hole 8, through one of the cards 13, etc. so that portions of the associated memory rod 26 inserted through that rod-hole may be energized for recordation as a memory unit or storage area. More particularly, each of the rod-holes 8 aligned along the direction of arrow 10 can provide the locus of a printed circuit coil which defines a storage area for one of the binary bits of a digital word. Thus, as indicated in FIGURE 2, card 13 provides six rows of coils with eight coils per row and thus defines a storage matrix which may be used to store six informational words, having eights bits per word. Similarly, cards 13′, 13″ etc. comprise like storage arrays or memory planes and for instance, where three cards are stacked in line (though more may be stacked, of course), the entire rod-memory array once the eight columns of rods (six rods per column) were inserted through cards 13, 13′, 13″ would comprise a memory array providing eighteen information words of eight binary bits each. It will be recognized as understood in the art that the desired word may be selected by energizing the pair of contacts 20, e.g. on card 13, associated with a desired word. As is conventional, the individual bits of a word may be read out by sensing the outputs induced thereby across the related sense wire contacts 36, 38. Storage of a word is usually performed by coincidentally applying digit pulses to the contacts 34, 36 of those binary digit columns within the card which are to store a particulai level of binary information. Thus, writing information may be accomplished by selecting a particular pair of word contacts 20 and applying a write-value of current thereto while coincidentally applying a supplementary value of write current to each of the digit contacts 34–36 associated with a bit-column of the chosen word in which a "1" bit is to be written (presuming that switching current is applied to write a binary "1" while none is applied to write a binary "0"). Thereafter, the particular "word" may be read out by applying a read-value of current to the associated connectors 20 and sensing the outputs at each bit-column location according to the switched state of the memory section of the associated memory rod 26, as indicated across sense contacts 36–38. Thus, when a binary "1" is stored in a particular column location (bit), the impressed read current upon the associated word contacts 20 will induce a given pulse output across connectors 36–38 of the associated column card 32. It will be clear, however, that other modes of operation of the indicated memory bank are possible and known to those skilled in the art.

It will be apparent that the coil-cards 13, 13′ etc. formed according to the invention coact with a linear cylindrical segment of each of the memory rods 26 so that when energized with the proper electrical current will provide a high symmetrical electro-magnetic flux pattern for switching a portion of the magnetic material on rod 26, which is enveloped by the particular series of windings formed by successive semi-circular segments 16. By increasing the number of folds in the solenoid cards 13, it is possible, of course, to increase the magnetic field intensity developed by the coils on the card 13, thus making it possible to reduce the value of drive current applied to the printed coils at contact portions 20 thereof. In addition, because of the symmertical field configuration provided by the concentric windings symmetrically about rod-holes 8, the current required of the driving source is yet further reduced while the stray flux which might undesirably affect adjacent memory rod portions is minimized.

It will be apparent that according to another feature of the invention, a rod memory bank is provided whereby one or several coil matrices provided by coil-cards 13 etc. is advantageously mated to a novel array of memory rods 26 mounted upon a connector baseboard 32 in conjunction with the digit and sense wires 30, 28 therefor, these wires being threaded about the hollow rods 26 and through rod-holes 8 therewith so as to present prepositioned, preconnected rod-column arrangements which are advantageous, for instance, being especially convenient for prefabrication and for joint insertion into prearranged sets of coil-cards 13 and the like. It will be recognized that such an arrangement of coil matrices provided by cards 13, 13′ etc. together with the prepackaged rod-baseboard arrangement 19 provides a configuration whereby it is possible to remove groups of magnetic rods (columns of rods) attached to a single printed circuit board and to replace or repair individual ones of these rods or their associated windings, very conveniently, unlike prior art arrangements.

It will be recognized that the coil matrix provided by the invention allows great versatility in the arrangement of coil matrices for rod memory arrays. For instance, it is only necessary to change the number of solenoidal coil cards in order to change the storage capacity of the memory for different applications, the addition of a card threaded through the rod columns providing an additional memory plane. This, of course, is in no way possible with prior art memory arrays such as magnetic core memories, thin film memories, or the like.

It will be further recognized that the above-indicated fabrication of a coil matrix card 13 provides great versatility for fabricating a coil matrix. For instance, with very little change in the indicated fabrication process, one may change the number of words, the number of bits, or the number of coil-turns provided by a coil-card. That is, given a card of standard width, one may increase the number of words in a memory array by merely adding another card to the array; moreover, by either increasing the number of rod-holes 8 per fold, or increasing the fold length to accomplish the same purpose, the number of bits per word may be increased; finally by merely increasing the number of folds (folding a greater length of web to provide a greater number of matrix groups 11), the number of coil-turns may be readily increased to provide greater magnetic force.

Furthermore, the above-indicated sinuous pattern of conductor fabrication, together with the folding of alternate sections soas to be superposed, form complementary symmetrical coil-halves about each rod-hole 8. Thus, the invention provides much greater efficiency than prior art techniques by providing a more complete inductive coupling between the looped portions 16 and the rod-holes 8 which are more completely surrounded thereby and which are surrounded so that looped portions conform more closely to the outer periphery of memory rods inserted therein. It will like wise be apparent to those skilled in the art that the invention provides a new and improved coil matrix configuration apt for employment in other environments besides the indicated memory rod storage array.

It will be apparent from the foregoing disclosure of the invention that numerous modifications, changes and equivalents which will occur to those skilled in the art will fall within the true scope and spirit contemplated by the invention and expressed in the following claims.

What is claimed is:

1. A planar inductive component adapted for forming into a coil matrix array for electronic computers, said component comprising:

a non-conductive substrate web and a plurailty of parallel conductor means affixed upon at least one surface of said web, each of said conductor means including complementary pairs of semi-coil segments, said segments being ohmically connected and arranged so that superposed, they comprise a matrix of coils.

2. A planar inductive component adapted for forming into a coil matrix array for electronic computers, said component comprising:

a non-conductive substrate web and a plurality of parallel conductor means affixed upon at least one surface of said web, each of said conductor means including repetitively occurring semi-coil segments, adjacent ones of said segments being arranged so as to be complementary, said segments being serially connected along said web so that when said web is folded intermediate said segments and said segments superposed, they form a matrix array of multi-turn inductor coils.

3. A method of fabricating an inductor matrix for use in electronic data processing systems, comprising the steps of:

forming a series of pairs of identical hole-matrix groups upon a foldable insulator substrate web;

affixing a plurality of conductor means upon said foldable insulator substrate web so as to undulate concentrically about said matrix holes, said conductors extending parallel along said web in pairs of similar alternating groups of semi-coil segments, succeeding segments being formed to be complementary;

and folding said substrate so as to superpose said complementary semicoil segments to form a matrix-turn inductor winding about said holes.

4. A matrix of inductor windings adapted for use in data processing systems comprising:

an insulating substrate web means having portions thereof folded back against one another to form a plurality of substantially parallel surfaces;

a plurality of conductor groups affixed upon certain contiguous ones of said surfaces; each of said groups including a plurality of similarly-undulating parallel printed conductor segments; each of said segments comprising a plurality of semi-coil sections; each of said sections being formed to define, with a corresponding complementary section in a succeeding segment, a relatively complete coil-turn; said segments each being connected ohmically to corresponding segments in succeeding conductor groups whereby each of said segments ineach of said groups comprises a part of a continuous coil conductor.

5. A folded web rod memory array comprising:

insulative web means having identical pairs of hole patterns formed therethrough and a plurality of conductor means, each sinuously extending along a respective row of holes along said web; said web being folded so as to present each hole in the pattern in registry with a related hole in the associated paired pattern and thus form relatively complete coil means thereabout; and a plurality of rod memory means, one each thereof being threaded through each of said coil means so as to coact operatively therewith when the corresponding one of said conductor means is energized.

6. A magnetic memory array comprising:

a plurality of magnetizable rod means arranged in a matrix of parallel rows and columns; an insulator web having pairs of matrices of holes therethrough, said hole matrix pairs being repeated and identical for accommodating said rod matrix, whereby upon folding of said web, one hole in each of said matrices may be superposed in registry with a corresponding hole in scucceeding matrices; said web further having applied thereto a plurality of conductor means each of which comprises a continuous conductor sinuously surrounding ones of said holes arranged along a prescribed row in each of said hole matrices, said conductors extending continuously therebetween, said conductors further being formed to provide semi-coil sections alternately and symmetrically about each of said holes in a manner which provides complementary coil sections between successive ones of said matrices whereby folded pairs of said hole-conductor matrices provide relatively complete inductor windings about said holes; and contact terminal means provided at the ends of said conductors to energize said conductors.

7. A magnetic rod memory array comprising a plastic ribbon having a plurality of holes therethrough, said holes being disposed in a plurality of identical, foldable and superposable hole-matrices, each hole matrix comprising identically arranged rows and columns of holes adapted to lie in registry when said ribbon is so folded, a plurality of coil-conductor means affixed to one surface of said ribbon and disposed to extend sinuously along different aligned ones of said hole-rows in each of said matrices as well as continuously therebetween, each of said conductor means being arranged to undulate concentrically about said holes whereby to form semi-coil sections which are complementary in successive pairs of matrices and whereby the folding of said ribbon so as to place each hole in each matrix in registry with a corresponding hole in every other matrix, superposes said coil sections to form relatively complete inductor windings, said conductors further including contact portions at the ends thereof, said ribbon being terminated adjacent said contact portions and adapted to be folded re-entrantly thereat; a plurality of cylindrical magnetic rods, each rod being adapted to be inserted through registered holes in each matrix when said ribbon is folded so that said holes are in registry, each of said rods having drive wire means and sense wire means; and a plurality of rod-connecting plate means adapted to serially connect said drive wire means between columnar groups of said rods, and also adapted to serially connect, in a prescribed order, said sense wire means and drive wire means being mounted to be ohmically connected to respective sense and drive wire contacts on said plate, each of said columnar arrays of rods, when thus mounted upon a respective one of said plates being adapted to be inserted into one of said rows of registered holes whereby said ribbon, as folded, will provide a matrix of complete multi-turn coil means for magnetically recording impressions upon coplanar segments of respective ones of said rods threaded therethrough.

8. The magnetic rod memory array of claim 7 and further comprising insulative strips located intermediate contiguous ones of said coil sections.

9. The magnetic rod memory array of claim 7 and further comprising additional ones of said folded ribbons to form a plurality of multi-turn coil matrices positioned along the length of said columnar array of rods.

10. The magnetic rod memory array of claim 9 and further comprising magnetic shielding means interposed between adjacent coil matrices.

References Cited

UNITED STATES PATENTS

| | | | |
|---|---|---|---|
| 3,339,184 | 8/1967 | Pick | 340—173 |
| 3,218,615 | 11/1965 | Reimer et al. | 340—174 |

OTHER REFERENCES

IEEE Transactions on Electronic Computers, vol. EC–13, No. 2, April 1964, pp. 106–111.

JAMES W. MOFFITT, *Primary Examiner.*

UNITED STATES PATENT OFFICE

CERTIFICATE OF CORRECTION

Patent No. 3,444,535 May 13, 1969

Roman E. Lukianov

It is certified that error appears in the above identified patent and that said Letters Patent are hereby corrected as shown below:

Column 9, line 33, "that superposed" should read -- that when superposed --. Column 10, line 1, "ineach" should read -- in each --; line 24, "scucceeding" should read -- succeeding --; line 66, "wire means and drive wire means" should read -- wire means along like columnar arrays of said rods, said sense wire means and drive wire means --.

Signed and sealed this 21st day of April 1970.

(SEAL)
Attest:

Edward M. Fletcher, Jr.
Attesting Officer

WILLIAM E. SCHUYLER, JR.
Commissioner of Patents